Dec. 26, 1944. M. MICHEL 2,365,896
CONTROL SYSTEM
Filed July 3, 1940

TENSION   STOP
SPEED

Inventor
M. Michel
by
Attorney

Patented Dec. 26, 1944

2,365,896

UNITED STATES PATENT OFFICE 2,365,896

CONTROL SYSTEM

Mathias Michel, Wauwatosa, Wis., assignor to Allis-Chalmers Manufacturing Company, Milwaukee, Wis., a corporation of Delaware Application July 3, 1940, Serial No. 343,719

21 Claims. (Cl. 242—75)

This invention relates in general to motor control and relates particularly to a control for a motor provided with a regulator for controlling a characteristic of such motor.

A motor connected to a reel in order to wind a strip of material thereon or a motor connected to one set of rolls in a multi-stand strip mill has been controlled to maintain constant tension on the strip of material during normal winding of the reel or during normal operation of the mill. In such systems a regulator has been provided to maintain a constant current in the armature of the winding motor. In these prior art systems, manual field control has been utilized for bringing the motor up to the speed at which the strip is being threaded into the mill. When the strip is threaded onto the reel, or through the set of rolls, operated by the motor, the tension regulator is connected for operation, but such regulator is not in its regulating position. The time necessary for the regulator to assume its regulating position causes a momentary change in the tension on the strip with its consequent disadvantages.

It is an object of the present invention to provide a control system avoiding the above disadvantage by providing an improved control of the threading speed of the motor.

It is also an object of the present invention to provide an improved control system for maintaining a tension on a winding strip of material.

It is a further object of the present invention to provide in a system of the above type, a means for controlling the regulator so that the tension on the strip is maintained more nearly constant.

It is a further object of the present invention to provide a means for controlling the regulator to decelerate and stop the winding motor in a new and improved manner.

It is also an object of the present invention to provide, in a control system for tensioning a strip of material, an improved means for regeneratively braking the tensioning motor by controlling the motor regulator.

Figure 1:
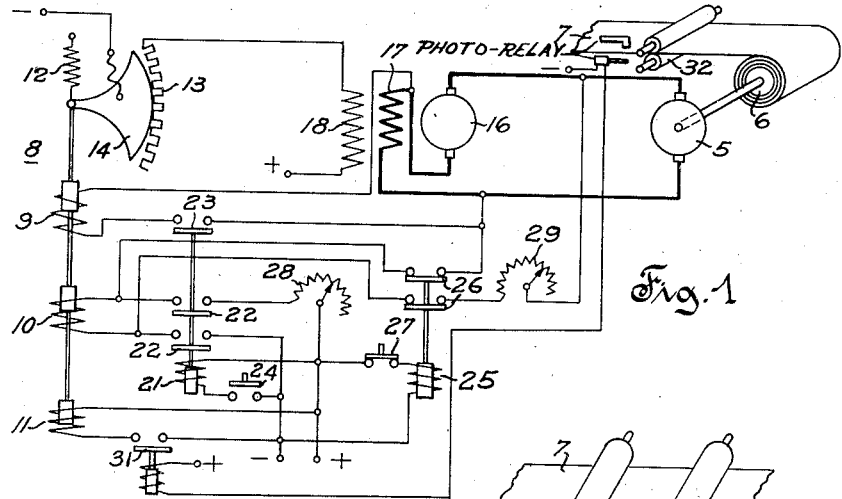
Figure 2:
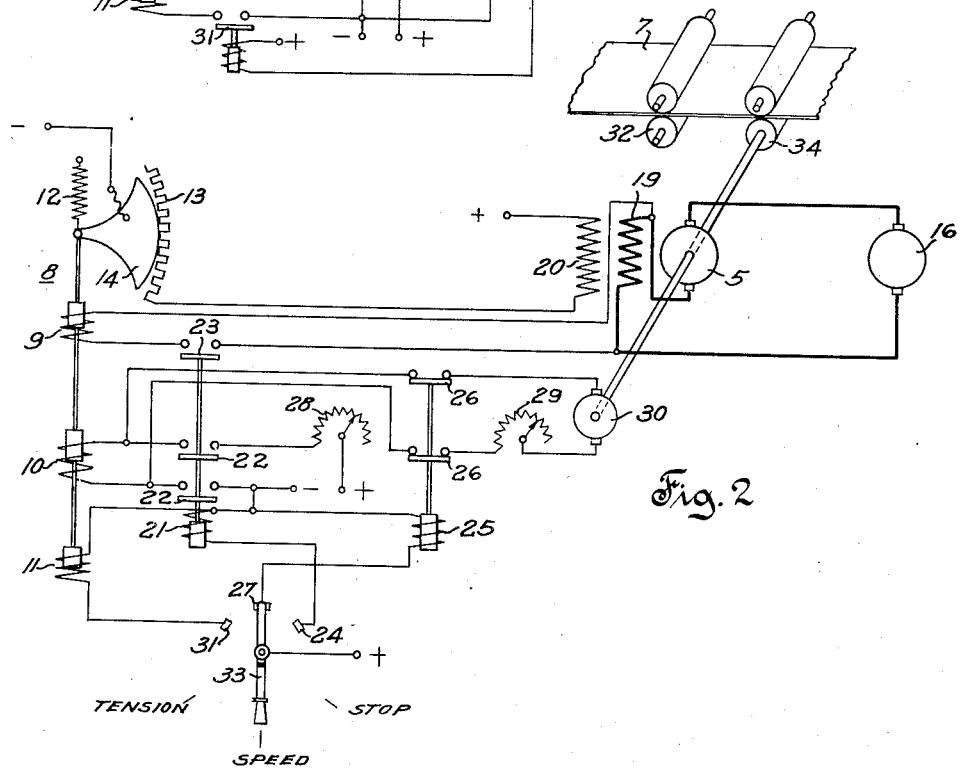

Objects and advantages other than those above set forth will be apparent from the following description when read in connection with the accompanying drawing, in which:

Fig. 1 is a schematic diagram of a control system embodying the present invention; and Fig. 2 is a schematic diagram of a modification of the present invention.

In the drawing, like elements in different figures have been given the same numerical designation. The system shown in Fig. 1 differs in general from that shown in Fig. 2 in that the control effected by the regulator 8 is applied to the generator 16 supplying the winding motor 5. In Fig. 2 the control effected by the regulator 8 is applied directly to the motor 5 itself.

In the embodiment of the invention illustrated in Fig. 1, a strip of material 7 is being wound on a reel 6 by the motor 5. The supply energy for the winding motor 5 is provided by generator 16 which is controlled by the regulator 8 to maintain the desired tension in the strip 7.

The control effected by the regulator 8 is caused by movement of the sector 14 which adds to or subtracts from the effective amount of the resistance 13 in circuit with the separately excited field 18 of generator 16. Movement of the sector 14 is caused by changes in the energization of its coils 9, 10 or 11 relative to the biasing force of the spring 12. The main coil 9 is connected to carry a current proportional to the current in the armature of the winding motor 5. As shown, the main coil 9 is connected across a winding 17 which may be the compound or interpole field winding of the generator 16 and which carries the armature current of the winding motor 5.

The action of the coil 9 of the regulator 8 is to maintain a constant current in the armature of the winding motor 5. This is accomplished by having the regulator balance at the desired value of current in the motor 5 and therefore in the winding 9. In the balanced position of the regulator 8, the ampere turns pull from the winding 9 (and any other energized windings) are just equal and opposite to the biasing force of the spring 12. If the current in the armature of the motor 5 tends to increase slightly, the energization of the winding 9 overcomes the force of the spring 12 and moves the sector downwardly to increase the amount of resistance 13 in circuit with the field winding 18. This decreases the field current and reduces the voltage of the generator 16, thereby reducing the current in the armature of the motor 5 until a balance of the regulator 8 is again obtained.

In order to avoid the disadvantages inherent in adjustment of the spring 12 in order to change the value at which the regulator balances, and therefore the value of the current in the motor 5, an adjusting coil 10 is supplied on the regulator 8. In the normal operation of motor 5, this adjusting coil is energized, the contacts 22 are closed to complete a circuit from a constant potential source through a manually adjustable resistance 28. The energization of coil 10 is added to that of coil 9 to provide a total number of ampere turns pull effective to hold the regulator 8 in balance against the spring 12.

When it is desired to thread the strip 7 through the rolls 32 and start winding the same on the reel 6, the speed of the motor 5 is controlled in a new and improved manner. The rolls 32 are driven at threading speed (a small percentage of normal mill speed) by a means not shown. In order to synchronize the speed of motor 5 with the threading speed of rolls 32, switch 27 is closed either manually or by remote control responsive to some phase of mill control.

This energizes relay 25, closing the contacts 26 and, as shown in Fig. 1, connecting the coil 10 across the terminals of the motor 5. An adjustable resistance 29 is included in series and by proper setting of resistance 29, the speed of motor 5 may be matched to the threading speed of the mill. Once this setting of resistance 29 is made, it remains the same for a given mill threading speed.

With the switches 24 and 31 in the open positions as shown in Fig. 1, the coils 9 and 11 are deenergized. Coil 10 acting alone will therefore cause the regulator 8 to maintain a constant voltage on the motor 5 and therefore a constant threading speed of the motor 5.

When the strip is "caught" on the reel 6, the regulator 8 is shifted from "speed" control to "tension" control (utilizing coil 9 for constant current control). No time is lost in action of the regulator 8 when this changeover is made, as it is in the proper position for current regulation. The no load and full load saturation curves of the generator 16 are not more than two percent different at any point thereon. Under speed regulation, the generator is operating on its no load saturation curve and under current regulation, on its full load curve. In changing from one to the other, it is unnecessary to change the field current more than two percent, which means that the regulator is physically substantially at its balanced position. No tension is lost and no looping or tearing occurs during the change from the threading or speed regulation to tension regulation.

The strip may be threaded onto the empty reel 6 by being held thereagainst by a wrapping device (not shown). After a few turns of the strip 7 have been wound on the reel 6, the wrapping device (which may be an endless belt held against the reel by several rolls) is removed from the reel by the operation of a control switch. An interlock on this wrapping device may be utilized to transfer the coil 10 from its connections across the motor 5 to the source of constant potential, by opening the contact 26 and by closure of the contact 22. Closure of the contact 22 also closes the contact 23 and the regulator 8 thereby becomes a current regulator which maintains the desired constant tension on strip 7 during the rolling operation.

If desired, the operation of contact 23 can be separate from the operation of contacts 22. This will permit both coils 9 and 10 to be effective at the same time with the coil 10 responsive to the voltage across the machine 5. This is desirable in certain installations as this regulation will give the generator 16 a heavy drooping characteristic with increasing current, thereby reducing the inrush current which occurs during inching of the machine 5.

If, for example, both coils 9 and 10 are effective and rheostat 29 is set for a given desired speed, it may be that such speed setting is a few percent too high. When the strip is caught on the reel 6 or fed through the rolls 34, and the speed setting is too high, the machine 5 will pull too hard on the strip and may break it. If the coil 9 is at the same time effective for current regulation, this will be prevented, for the increased current due to excessive tension will cause the regulator to decrease such current.

If the strip 7 is run out of the operating rolls 32 with the regulator 8 in control, or if the strip 7 breaks between the operating rolls 32 and the reel 6, the motor 5 will immediately speed up to its maximum speed as the current therein collapses due to lack of tension. An additional coil 11 on the regulator 8 is provided to control the motor in such instances or at any time it is desired to stop the motor 5. The coil 11 acts on the regulator 8, with its effect additive to that of the coils 9 and 10. Contact 31, which may be manually operated, may be operated by the mill "stop" control, or may be operated responsively to breakage in the strip 7, as by the photo-relay shown, energizes coil 11 from a constant potential source. The photo-relay is shown conventionally, and may be of any suitable type, for example, as disclosed in the patent to T. B. Montgomery, U. S. 2,232,073, February 18, 1941. The action of the coil 11 is to increase a predetermined amount the number of ampere turns required to balance the regulator 8 against the spring 12. The reaction of the regulator to the energization of coil 11 is similar to its reaction to a great increase of current through the armature of the motor 5.

As a result of the increase in ampere turns necessary to balance the regulator, the regulator 8 will decrease the voltage of the generator 16 in an attempt to reduce the armature current of the motor 5. If the total ampere turns of the coils 11 and 10 is greater than the ampere turns of the coil 9, the regulator 8 will continue to decrease the voltage of generator 16 until the counter E. M. F. of the motor 5 is higher than the generated voltage of the generator 16. The current in the motor 5 thereupon reverses and with such reversal of current the torque of the motor reverses and acts as a brake, thereby bringing about a quick deceleration and stopping of the motor 5.

As the current in the motor armature reverses, the current in the main coil 9 of the current regulator changes its direction and, therefore, the ampere turns of coil 9 oppose the ampere turns of the coils 11 and 10. The reversed armature current therefore reduces the pull on the regulator 8, and for a given value of armature current, the regulator 8 will have again exactly enough ampere turns to remain in balance against its spring. At this value of reversed armature current, the regulator 8 will stop decreasing the voltage of generator 16 until the reversed current has a tendency to decrease.

The motor 5 will therefore be regeneratively braked and stopped with a limited value of feed back current. By limiting this value of the braking current, the motor 5 can be stopped without any major switching operation and without injury to the motor 5 by excessive dynamic braking current.

It is therefore seen that by a simple control of a conventional regulator normally utilized to maintain constant current in a reel motor, both an improved starting and stopping control of such motor is obtained.

In Fig. 2, the present invention is applied to a control system in which the current regulator acts directly on the motor 5 rather than on the generator 16. The regulator 8 and its control are similar to that shown in Fig. 1 except that the regulator controls a field 20 on the motor 5 and its main winding 9 acts responsively to the current through the interpole or compound field windings 19 of the motor 5. The adjusting coil 10, when utilized to make the regulator 8 a voltage or speed regulator, is connected across a pilot generator 30 mechanically connected to the shaft of the motor 5. With the connections as shown in Fig. 2, the winding 10 is supplied with a voltage proportional to the generated E. M. F. or speed of the motor 5.

In this embodiment the motor 5 is shown as driving one stand of rolls in a multi-stand mill. The necessity for controlling the threading speed of motor 5 is the same as in Fig. 1. The coils 11, 21 and 25 are shown controlled by controller 33 provided with "stop," "speed" and "tension" positions, in which contacts 31, 27 and 24 are closed, respectively.

With controller 33 in the "speed" control position shown, contacts 26 are closed, and regulator coil 10 is connected across the pilot generator 30 in series with the resistance 29. By adjustment of resistance 29, the threading speed of rolls 34 is matched to that of rolls 32 and the strip 7 can be easily threaded into the rolls 34.

Upon threading the strip into rolls 34, the tension may be applied by manually moving controller 33 to "tension" position. If desired, coil 21 may instead be energized automatically as, for example, by the strip 7 cutting off a beam of light at the entering side of rolls 34 and controlling a light sensitive relay which in turn energizes coil 21 and deenergizes coil 25. Any suitable limit switch actuated by the strip 7 before entering the rolls 34 may be used. A time lag in the operation of the relay sufficient to prevent changeover until the strip is threaded in the rolls would be necessary. The position of the movable element of regulator 8, at the time of changeover from speed to tension control, will be within 2% of its position for current regulation.

Under tension control the field 20 of the motor 5 is controlled by regulator 8 to maintain the armature current of motor 5 constant. An increase in current in the winding 9 moves the sector 14 downward against the bias of the spring 12 and thereby decreases the amount of resistance 13 in circuit with the field 20. The resultant increase in field current increases the counter E. M. F. of the motor 5, thereby reducing the current flowing in the armature of the motor 5 until the regulator balances.

When the controller 33 is moved to "stop" position, or coil 11 is otherwise energized, regenerative braking occurs with a limited maximum feed back current in a manner similar to the control of Fig. 1. However, in the embodiment of Fig. 2, it may be desirable to have the field of generator 16 collapsed by some ancillary means not shown. The increase in C. E. M. F. of motor 5, due to energization of coil 11, to a value greater than the voltage of generator 16, reverses the armature current, thereby reversing the motor torque. The reversed current is limited to a value at which coil 9 (carrying reversed current) plus the bias of spring 12, is just equal to the pull of coils 10 and 11.

Either control system shown may be applied to a reel motor, a tension roll motor or one of several roll motors. The various regulator coils of either system may be controlled as shown or described in reference to either system.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a motor control system, a motor, means for controlling the voltage of said motor so as to maintain the current in the armature circuit thereof substantially constant, said means comprising a regulator provided with an element balanced against a bias force when said current is constant, and means for stopping said motor comprising means for decreasing the effect of said bias force.

2. In a motor control system, a motor, means for controlling the voltage of said motor so as to maintain the current in the armature circuit thereof substantially constant, said means comprising a regulator provided with an element balanced against a bias force when said current is constant, and means for stopping said motor while maintaining said armature circuit closed comprising a winding on said regulator operable on said element against said bias force.

3. In a motor control system, a motor, means for controlling the voltage of said motor so as to maintain the armature current thereof substantially constant, said means comprising a regulator element balanced against a bias force by the effect of a winding provided with a predetermined number of ampere turns when said current is maintained constant, and means for decelerating and stopping said motor by increasing said ampere turns of said winding.

4. In a control system, a reel for a strip of material, a motor connected to said reel, means for maintaining the armature current of said motor substantially constant, said means comprising a regulator element balanced against a bias force by the effect of a winding provided with a predetermined number of ampere turns when said current is maintained constant, and means operatively responsive to breakage of said strip for increasing said ampere turns of said winding to stop said motor.

5. In a control system, a reel for a strip of material, a motor connected to said reel, means for maintaining the armature current of said motor substantially constant, said means comprising a regulator element balanced against a bias force by the effect of a predetermined number of ampere turns when said current is maintained constant, and means operatively responsive to breakage of said strip for increasing said ampere turns in amount greater than said bias force.

6. In a control system, a reel for strip material, a motor connected to said reel, a regulator, means for controlling said regulator to maintain the current through the armature of said motor substantially constant, means for controlling said regulator to maintain the speed of said motor substantially constant, and means comprising a relay providing for selective operation of one of said regulator controlling means.

7. In a control system, a reel for strip material, a motor connected to said reel, means for regulating the field of said motor to maintain the armature current thereof substantially constant, means for regulating said field of said motor to maintain the speed thereof substantially constant, and means for utilizing both said means at the same time.

8. In a control system, a reel for strip material, a motor connected to said reel, means for regulating the field of said motor to maintain the armature current thereof substantially constant, a second means for regulating said field of said motor to maintain the speed thereof substantially constant, and means for rendering both said means operative to provide said motor with a heavy drooping voltage characteristic with increase in armature current.

9. In a motor control system, a motor, means comprising an electric device provided with a winding responsive to the armature current of said motor for controlling the voltage of said motor, an additional winding on said device, and means for energizing said additional winding for regenerative braking of said motor at a limited maximum motor current.

10. In a motor control system, a motor, means comprising an electric device provided with a winding responsive to the armature current of said motor for controlling the voltage of said motor, an additional winding on said device, and means comprising said additional winding for reversing said armature current and thereby stopping said motor.

11. In a motor control system, a motor, means comprising an electric device provided with a winding responsive to the armature current of said motor for controlling the voltage of said motor, an additional winding on said device, and means comprising said additional winding for reversing said armature current and limiting said reverse current to a predetermined maximum value.

12. In a control system, a reel for a strip of material, a motor connected to said reel for exerting a winding torque thereon, a regulator for controlling the current in the armature of said motor, means for actuating said regulator to maintain the voltage of said motor substantially constant during threading of said strip of material on said reel, and means for actuating said regulator to maintain said motor armature current substantially constant to provide a constant tension on said strip of material after threading on said reel.

13. In a control system, a reel for a strip of material, a motor connected to said reel for exerting a winding torque thereon, a regulator for controlling the current in the armature of said motor, means for actuating said regulator to maintain the voltage of said motor substantially constant during threading of said strip of material on said reel, means for actuating said regulator to maintain said motor armature current substantially constant to provide a constant tension on said strip of material after threading on said reel, and means for utilizing both said actuating means simultaneously while tensioning said strip of material.

14. In a control system, a reel for a strip of material, a motor connected to said reel for exerting a winding torque thereon, a regulator for controlling the current in the armature of said motor, means for actuating said regulator to maintain the voltage of said motor substantially constant during threading of said strip of material on said reel, means for actuating said regulator to maintain said motor armature current substantially constant to provide a constant tension on said strip of material after threading on said reel, and means for actuating said regulator to regeneratively brake and stop said motor.

15. In a control system, a reel for a strip of material, a motor connected to said reel for exerting a winding torque thereon, a regulator for controlling the current in the armature of said motor, means for actuating said regulator to maintain the voltage of said motor substantially constant during threading of said strip of material on said reel, means for actuating said regulator to maintain said motor armature current substantially constant to provide a constant tension on said strip of material after threading on said reel, and means for actuating said regulator to regeneratively brake and stop said motor upon breaking of said strip of material.

16. In a control system, a reel for a strip of material, a motor connected to said reel for exerting a winding torque thereon, a regulator for controlling the current in the armature of said motor, means for actuating said regulator to maintain the voltage of said motor substantially constant during threading of said strip of material on said reel, means for actuating said regulator to maintain said motor armature current substantially constant to provide a constant tension on said strip of material after threading on said reel, and means for actuating said regulator to regeneratively brake and stop said motor and to limit the reversed armature current of said motor.

17. In a method of regeneratively braking a motor provided with an armature current responsive regulator for controlling the voltage of said motor, the step comprising the application to said regulator of an additional force having an effect on said regulator similar to the effect of a substantial increase in motor armature current.

18. In a motor control system, a motor, an electromagnetic regulator provided with an operating winding connected responsively to the armature current of said motor and provided with a current varying element connected in circuit with the field of said motor, and means for regeneratively braking said motor comprising an additional winding on said regulator operable upon energization thereof to add to the effective ampere turns of said operating winding.

19. In a control system, a reel for strip material, a dynamo-electric machine connected to said reel, means for maintaining a first electrical characteristic of said dynamo-electric machine at a predetermined value, said means comprising a regulator provided with a first winding adapted to be energized responsively to said first characteristic, means comprising a second winding on said regulator providing for adjustment of said predetermined value, and means for operatively deenergizing said first winding and for energizing said second winding responsively to a second characteristic of said dynamo-electric machine.

20. In a method of regeneratively braking a motor provided with an armature current responsive regulator having a winding balanced against a bias force, the step comprising the application to said regulator of a force operatively decreasing said bias force.

21. In a method of regeneratively braking a motor provided with an armature current responsive regulator having a winding balanced against a bias force, the step comprising the application to said regulator of a constant predetermined force operatively decreasing said bias force.

MATHIAS MICHEL.